(12) United States Patent
Hagen-Eggert et al.

(10) Patent No.: US 11,199,500 B2
(45) Date of Patent: Dec. 14, 2021

(54) METHOD AND MICROSCOPY SYSTEM FOR RECORDING A MICROSCOPIC FLUORESCENCE IMAGE OF A SAMPLE REGION CONTAINING A BIOLOGICAL SAMPLE

(71) Applicant: EUROIMMUN Medizinische Labordiagnostika AG, Luebeck (DE)

(72) Inventors: Martin Hagen-Eggert, Luebeck (DE); Tilman Johannes Sumpf, Luebeck (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 0 days.

(21) Appl. No.: 16/718,503

(22) Filed: Dec. 18, 2019

(65) Prior Publication Data
US 2020/0200682 A1    Jun. 25, 2020

(30) Foreign Application Priority Data
Dec. 20, 2018  (EP) .................................... 18214781

(51) Int. Cl.
*G01N 21/64* (2006.01)
*G02B 21/16* (2006.01)
*G01N 21/359* (2014.01)

(52) U.S. Cl.
CPC ......... *G01N 21/6486* (2013.01); *G02B 21/16* (2013.01); *G01N 21/359* (2013.01)

(58) Field of Classification Search
CPC ... G01N 21/6486; G01N 21/359; G02B 21/16
See application file for complete search history.

(56) References Cited

U.S. PATENT DOCUMENTS

2008/0251694 A1\* 10/2008 Tanimoto ........... G02B 21/0012
                                                           250/208.1
2011/0270092 A1    11/2011 Kang et al.
(Continued)

FOREIGN PATENT DOCUMENTS

DE   10 2008 015 885    10/2009
EP       3 369 405       9/2018
(Continued)

OTHER PUBLICATIONS

Extended Search Report dated Jun. 14, 2019 in European Application No. 18214781.9 with English translation, 13 pages.
(Continued)

*Primary Examiner* — Jamil Ahmed
(74) *Attorney, Agent, or Firm* — Zeller IP Group, PLLC; Kyle M. Zeller

(57) ABSTRACT

A method is useful for recording a microscopic fluorescence image of a sample region. An objective directs a laser beam on the sample region having boundary surface(s). A relative distance between the objective and the sample region is altered along an optical axis of the objective to effectuate respective, different relative distances. A respective set of pixel intensity values are effectuated on sensor pixels of an image sensor by the laser beam and transmitted back through the objective is captured for a respective relative distance. A respective focus metric is determined for a respective relative distance based on the respective set of pixel intensity values captured for the respective relative distance. A preferred relative distance is determined based on the determined focus metrics. The preferred relative distance is set, the sample region is illuminated with excitation radiation and the microscopic fluorescence image is captured via the image sensor.

18 Claims, 12 Drawing Sheets

(56) References Cited

U.S. PATENT DOCUMENTS

| | | |
|---|---|---|
| 2015/0381909 A1 | 12/2015 | Butte et al. |
| 2016/0041380 A1* | 2/2016 | Kuhn ............... H04N 5/232121 348/79 |
| 2016/0364858 A1 | 12/2016 | Butte et al. |
| 2018/0309980 A1 | 10/2018 | Ootsuki |

FOREIGN PATENT DOCUMENTS

| | | | |
|---|---|---|---|
| JP | 6259156 B1 * | 1/2018 | ............... G02B 5/22 |
| WO | 2016/022359 | 2/2016 | |
| WO | 2016/133787 | 8/2016 | |

OTHER PUBLICATIONS

U.S. Appl. No. 16/623,440, filed Dec. 17, 2019, Pannhoff et al.
U.S. Appl. No. 16/569,772, filed Sep. 13, 2019, Sumpf et al.

* cited by examiner

Fig. 4a      Fig. 4b      Fig. 4c      Fig. 4d
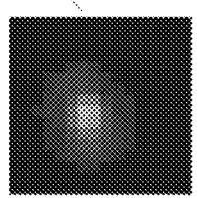
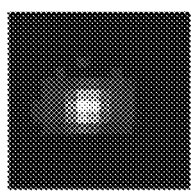
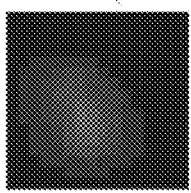
65a          65b          65c                       66
Z = -0.5 μm   Z = 0 μm     Z = +0.5 μm
$G_{max}$=153  $G_{max}$=223  $G_{max}$=58
Fig. 4e
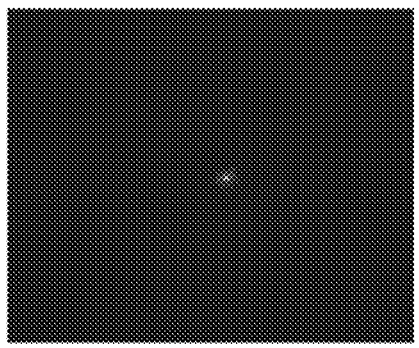
63

METHOD AND MICROSCOPY SYSTEM FOR RECORDING A MICROSCOPIC FLUORESCENCE IMAGE OF A SAMPLE REGION CONTAINING A BIOLOGICAL SAMPLE

CROSS-REFERENCE TO RELATED APPLICATIONS

The present application claims the benefit to the European application EP18214781.9, filed on Dec. 20, 2018, which is incorporated by reference in its entirety.

BACKGROUND OF THE INVENTION

Field of the Invention

The related art has disclosed methods and apparatuses in which focusing for a camera or an image sensor in relation to a sample region containing a biological sample is undertaken by means of a laser beam and wherein a fluorescence image of the sample region is subsequently captured.

Discussion of the Background

In particular, a method is known, in which a reflection in a so-called red channel is captured with a first camera or a first image sensor using a laser beam at a wavelength of, e.g., 635 nm in order to set an optimal alignment or an optimal distance of the sample region from an objective of the microscope for focusing purposes. Then, a fluorescence image of the sample region containing the biological sample is captured in a green channel using a further camera. Hence, green fluorescence images can be captured in this case in a green channel which has no red components.

DE102008015885A1 describes a method for automatic focusing of optical appliances, wherein images with concentric rings are recorded to this end, the diameters of said rings altering on the basis of a distance from the focus position to be determined.

WO2016/133787A1 discloses a method and a system for automatic focusing of a microscope, wherein a peak value of a reflected laser beam is used as an indication of a degree of focusing of the system.

SUMMARY OF THE INVENTION

It is an object of the present invention to provide a system and a method for recording a microscopic fluorescence image with automatic focusing, which are particularly capable.

The object according to the invention is achieved by the proposed method for recording a microscopic fluorescence image of a sample region containing a biological sample. A laser beam is directed by means of at least one objective on the sample region, the latter having at least one boundary surface, wherein the objective effectuates focusing of the laser beam in a focusing plane. A relative distance between the objective and the sample region is altered along an optical axis of the objective in order to effectuate respective, different relative distances. Here, a respective set of pixel intensity values is captured for a respective relative distance, said pixel intensity values being effectuated on corresponding sensor pixels of an image sensor by the laser beam that was reflected at the boundary surface and transmitted back through the objective. Further, a respective focus metric is determined for a respective relative distance on the basis of the respective set of pixel intensity values captured for the respective relative distance. Further, a preferred relative distance is determined on the basis of the determined focus metrics. Finally, the preferred relative distance is set, the sample region is illuminated with excitation radiation and the microscopic fluorescence image is captured by means of the image sensor, in particular at the preferred relative distance or when a preferred relative distance is set.

The object underlying the invention is achieved by the subject matter of following various embodiments.

1. Method for recording a microscopic fluorescence image of a sample region (P) containing a biological sample, said method comprising:
   directing a laser beam (LS) by means of at least one objective (OB) on the sample region (P), the latter having at least one boundary surface (59), wherein the objective (OB) effectuates focusing of the laser beam (LS) in a focusing plane,
   changing a relative distance between the objective (OB) and the sample region (P) along an optical axis (OA) of the objective (OB) for the purposes of effecting respective, different relative distances,
   for a respective relative distance:
      capturing a respective set of pixel intensity values that are effectuated on corresponding sensor pixels of an image sensor (BS) by the laser beam (LS) that is reflected at the boundary surface (57) and transmitted back through the objective (OB)
      and further determining a respective focus metric on the basis of the respective set of pixel intensity values captured for the respective relative distance,
   determining a preferred relative distance on the basis of the determined focus metrics,
   setting the preferred relative distance, illuminating the sample region (P) with excitation radiation (AS) and capturing the microscopic fluorescence image by means of the image sensor (BS), characterized
   in that the image sensor (BS) is a photosensor (PS) with a colour filter matrix (FFM) disposed upstream thereof,
   in that the microscopic fluorescence image is a colour image
   and in that the laser beam (LS) has a wavelength (WB) in the near infrared range.
2. Method according to embodiment 1, characterized in that the microscopic fluorescence image is a digital colour image, more particularly a non-monochrome, digital colour image, preferably having at least a green component and a red component, particularly preferably further having a blue component.
3. Method according to embodiment 1, characterized in that the wavelength is greater than 780 nm.
4. Method according to embodiment 3, characterized in that the wavelength is greater than 800 nm, particularly preferably greater than or equal to 850 nm.
5. Method according to embodiment 3, characterized in that the wavelength lies in a range of 780 nm to 1000 nm, preferably 800 nm to 1000 nm.
6. Method according to embodiment 1, characterized in that the colour filter matrix (FFM) is a matrix with a plurality of colour channels, in particular with at least a green channel and a red channel, preferably further with also a blue channel.
7. Method according to embodiment 6, characterized in that the colour filter matrix (FFM) is a Bayer matrix.
8. Method according to embodiment 1, characterized in that the photosensor (PS) is a CMOS sensor or a CCD sensor.

9. Method according to embodiment 1, wherein capturing a respective set of pixel intensity values for a respective relative distance is implemented by way of capturing respective subsets of pixel intensity values of respective colour channels and wherein the respective set of pixel intensity values is determined on the basis of the subsets.

10. Method according to embodiment 9, characterized in that the respective colour channels have a respective transmissivity at the wavelength of the laser beam (LS), said transmissivity values deviating from one another by no more than a factor of 5.

11. Method according to embodiment 1, wherein the laser beam (LS) substantially has a collimated, parallel bundle of rays.

12. Method according to embodiment 1, wherein a lens or lens system (TS) is disposed in a detection beam path between the objective (OB) and the image sensor (BS), said lens or lens system imaging a focal plane of the objective (OB) on the image sensor (BS).

13. Method according to embodiment 1, further comprising:
   determining a respective highest pixel intensity value as a respective focus metric for a respective relative distance on the basis of the respective set of pixel intensity values,
   determining a profile (73) of the highest pixel intensity values by assigning the respective highest pixel intensity value to the respective relative distance.
   determining the preferred relative distance on the basis of at least one maximum (77) of the profile (73) of the highest pixel intensity values.

14. Method according to embodiment 13, further comprising:
   changing the relative distance by reducing the relative distance to a smallest distance using a first distance resolution after starting from a greatest distance such that the profile has a plurality of maxima (73, 75, 77),
   determining a temporarily preferred relative distance (79) on the basis of the plurality of maxima (73, 75, 77),
   increasing the relative distance to the temporarily preferred relative distance using a second distance resolution, which is higher than the first distance resolution, while simultaneously capturing respective highest pixel intensity values (81) as respective focus metrics at respective, further relative distances,
   detecting the presence of a local maximum (82) on the basis of the further highest pixel intensity values (81) and determining the preferred, final relative distance as the relative distance at which the local maximum is present.

15. Microscopy system (V) for recording a microscopic fluorescence image of a sample region (P) containing a biological sample, said microscopy system comprising:
   a sample holder (PH) for holding the sample region (P) that has at least one boundary surface (57), a laser source (LL) for generating a laser beam (LS), an excitation light source (AL) for emitting excitation light (AS) onto the sample region (P), at least one objective (OB) that is embodied to direct the laser beam (LS) on the sample region (P) and further effectuate focusing of the laser beam (LS) in a focusing plane, and an image sensor (BS) for capturing a set of pixel intensity values that are effectuated on corresponding sensor pixels of the image sensor (BS) by the laser beam (LS) that is reflected at the boundary surface (59) and transmitted back through the objective (OB),
   wherein the objective (OB) and the sample holder (PH) are displaceable relative to one another along an optical axis (OA) of the objective (OB) such that a relative distance between objective (OB) and sample region (P) can be altered,
   further comprising at least one processor (P), the latter being embodied to
      actuate the objective (OB) and/or the sample holder (PH) in such a way that the objective (OB) and the sample holder or the sample region (P) have respective, different relative distances from one another,
      capture a respective set of pixel intensity values for a respective relative distance by means of the image sensor (BS) and further determine a respective focus metric on the basis of the respective set of pixel intensity values,
      determine a preferred relative distance on the basis of the determined focus metrics,
      actuate the objective (OB) and/or the sample holder (PH) in such a way that the preferred relative distance is set, further activate the excitation light source (AL) and capture the microscopic fluorescence image by means of the image sensor (BS),
   characterized
      in that the image sensor (BS) is a photosensor with a colour filter matrix (FFM) disposed upstream thereof,
      in that the microscopic fluorescence image is a colour image
      and in that the laser beam (LS) has a wavelength (WB) in the near infrared range.

16. Processor, comprising one or more interfaces,
   wherein, via the one or more interfaces, the processor is embodied too
      provide a first control signal for activating a laser light source,
      provide a second control signal for actuating an objective (OB) and/or a sample holder (PH) such that the objective and the sample holder have respective, different relative distances from one another, and
      receive, from an image sensor with a colour filter matrix disposed upstream thereof, a respective set of pixel intensity values for a respective relative distance,
   wherein the processor is further embodied to further determine a respective focus metric on the basis of the respective set of pixel intensity values and to determine a preferred relative distance on the basis of the determined focus metrics,
   wherein, via the one or more interfaces, the processor is embodied to
      provide the second control signal or a further control signal for actuating the objective (OB) and/or the sample holder (PH) in such a way that the preferred relative distance is set,
      further provide a third control signal for activating an excitation light source (AL),
      and receive pixel intensity values from the image sensor,
   wherein the processor is further embodied to determine a microscopic fluorescence image on the basis of the received pixel intensity values, characterized in that the microscopic fluorescence image is a colour image and in that the laser light source has a wavelength in the near infrared range.

BRIEF DESCRIPTION OF DRAWINGS

Below, the invention is explained in more detail on the basis of specific embodiments and on the basis of the figures, without restricting the general concept of the invention. In detail:

FIGS. 4a, 4b and 4c show examples of pixel intensities of a portion of a detection area of an image sensor with partial images recorded with different relative distances, FIG. 4d shows an example of a predetermined area within the portion, FIG. 4e shows an example of pixel intensities of an image sensor during focusing.

DETAILED DESCRIPTION OF THE INVENTION

Figure 1:
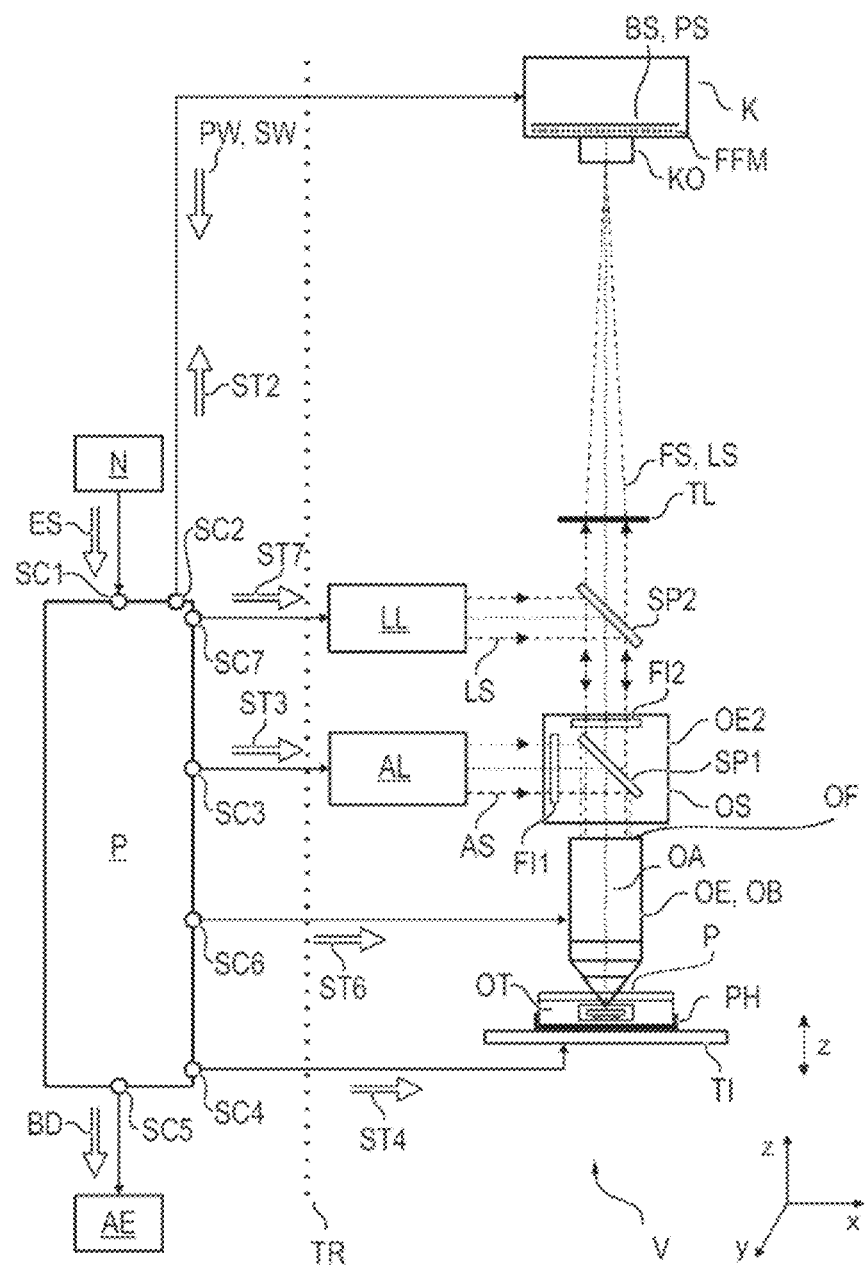
FIG. 1 shows a preferred embodiment of a proposed microscopy system.

The method according to the invention is characterized in that the image sensor is a photosensor with a colour filter matrix disposed upstream thereof, wherein, further, the microscopic fluorescence image is a colour image, in particular a non-monochrome colour image, and wherein the laser beam has a wavelength in the near infrared range.

The proposed method according to the invention allows a fluorescence image of the sample region to be captured as a colour image, wherein only a single image sensor has to be used for capturing the colour image and for the focusing process since a colour filter matrix is disposed upstream of the image sensor. This image sensor with the colour filter matrix disposed upstream of the image sensor can likewise be used at the same time for capturing pixel intensity values during the focusing since the laser has a wavelength in the near infrared range.

The near infrared range is an infrared range that is invisible to humans and a wavelength range in which a particular interaction between the colour filter matrix and the laser beam arises, as will be explained in more detail below.

Capturing a laser at a wavelength of, e.g., 635 nm in a separate red channel with a separate image sensor or camera and a separate optical colour filter is conventional according to the related art. Were a laser beam at a wavelength of 635 nm to be used for the focusing process in combination with the one image sensor or photosensor in combination with a colour filter matrix, it would not necessarily be possible to ensure that the laser beam strikes regions of the colour filter matrix that are sufficiently transmissive to red light at this wavelength of 635 nm. A colour filter matrix usually consists of different filter element types for different colour channels, in particular at least of red channel and green channel types, particularly preferably, further, of a blue channel type as well. Then, the colour filter matrix is constructed from a two-dimensional arrangement of a plurality of colour filter elements, wherein colour filter elements immediately adjacent to one another in an arrangement direction are of different filter element types in each case. Therefore, the laser beam striking a filter element of a suitable colour channel or of the red channel of the colour filter matrix and a sufficient amount of said laser beam then being transmitted to the image sensor cannot be ensured in the case of the colour filter matrix. Therefore, the use of such a laser at 630 nm in combination with the image sensor and the colour filter matrix would be problematic for focusing since there could be an unwanted suppression of the laser light by certain regions or filter elements of the colour filter matrix.

A surprising effect is exploited as a result of, according to the invention, a laser beam in the near infrared range being used and as a result of the image sensor comprising the colour filter matrix disposed upstream thereof: in the near infrared range, commercially available colour filter matrices can be sufficiently transmissive to light in the near infrared range in all their channels or in all their portions with different colour channels, in particular for a wavelength of greater than 780, preferably greater than 800 nm, particularly preferably greater than or equal to 850 nm.

As a result of this, the same image sensor can be used both for capturing the fluorescence image in the form of a colour image and for focusing by means of the laser beam, even though the colour filter matrix is disposed upstream of said image sensor. As a result of the fluorescence image being captured as a colour image, it is likewise possible to be able to present to the user an image that not only has a colour shift and/or fluorescence in a single green channel, but also has a colour shift and/or fluorescence in other colour ranges or colour channels, such as a red channel, for example. Fluorescence images of biological samples such as biological tissue, for example, do not only have pure green colouring on account of bindings of fluorescent dyes, but possibly further also have stains that are visible not only in a green range but also, for example, in an orange or brown range, such that red components come to bear. Further, the tissue or organ tissue may also exhibit so-called autofluorescence, which likewise tends to be visible to the user in an orange range or brown range. The user, for example a physician, would then like to make a diagnosis and they are sometimes used to looking through an eyepiece of a microscope and optically perceiving an observation of the fluorescence image without further colour shifts or colour channel selections for the purposes of subsequently making a diagnosis. If, as is known in the related art, use is only to be made of a green channel, the user would then not subsequently be able to perceive other colour components during the reproduction of the fluorescence image in the case of precisely such a pure green channel fluorescence image. Therefore, precisely in an advantageous manner, a method is provided in which an image sensor with a colour filter matrix disposed upstream thereof can be used for obtaining the fluorescence image as a colour image, wherein this image sensor with the colour filter matrix disposed upstream thereof can simultaneously also be used for focusing on the basis of the laser beam in the near infrared range. Thus, no further, additional or separate camera or image sensor is required for detecting a reflected laser beam.

Advantageous embodiments of the invention are explained in more detail in the following description, with reference being made in part to the figures.

Preferably, the microscopic fluorescence image is a digital colour image, in particular with at least a green component and a red component. Particularly preferably, the digital colour image further has a blue component. Such colour components can be represented by a digital colour image that corresponds to an RGB colour coding. However, it is alternatively also conceivable for the digital colour image to represent such colour components in a different colour coding, such as a CMYK colour coding, for example.

Preferably, the colour filter matrix is a matrix with a plurality of colour channels, comprising at least a green channel and a red channel, particularly preferably further comprising a blue channel as well. Particularly preferably, the colour filter matrix is an RGB matrix.

The wavelength is preferably greater than 780 nm, preferably greater than 800 nm. The wavelength preferably lies in a range of 780 nm to 1000 nm, preferably in a range of 800 nm to 1000 nm. In a particular embodiment, the wavelength is 850 nm.

The colour filter matrix is preferably a Bayer matrix.

The photosensor is preferably a CMOS sensor or a CCD sensor.

Capturing a respective set of pixel intensity values for a respective relative distance is preferably implemented by way of capturing respective subsets of pixel intensity values of respective colour channels, wherein the respective set of pixel intensity values is determined on the basis of the respective subset of pixel intensity values. Preferably, pixel intensity values of a respective subset are weighted in this case by a predetermined scaling factor, the latter depending on the type of colour channel to which the respective subsets of pixel intensity values belong. As a result of this, it is possible to compensate transmissivity differences between the individual colour channels of the colour filter matrix.

Preferably, the respective colour channels of the colour filter matrix have a respective transmissivity at the wavelength of the laser beam, said transmissivity values deviating from one another by no more than a factor of 5. As a result of this, it is possible to determine a respective set of pixel intensity values from pixel intensities of the respective colour channels by means of colour channel-dependent scaling of the pixel intensity values, wherein, precisely, the intensity values of the respective colour channels do not deviate so far from one another that scaling of the respective values depending on the type of colour channel would effectuate too much of a deterioration in relation to a signal-to-noise ratio.

Preferably, the laser beam substantially is a collimated, parallel bundle of rays.

Preferably, a lens or lens system is disposed in a detection beam path between the objective and the image sensor, said lens or lens system imaging a focal plane of the objective on the image sensor.

Preferably, there is a determination of a respective highest or maximum pixel intensity value as a respective focus metric for a respective relative distance on the basis of the respective set of pixel intensity values. Further, there preferably is a determination of a profile of the highest pixel intensity values by assigning the respective highest pixel intensity value to the respective relative distance. There preferably is a determination of the preferred relative distance on the basis of at least one maximum of the profile of the highest pixel intensity values.

Preferably there is a change in the relative distance by reducing the relative distance to a smallest distance using a first distance resolution after starting from a greatest distance such that the profile has a plurality of maxima. Preferably, there is a determination of a temporarily preferred relative distance on the basis of the plurality of maxima. Preferably there is then an increase in the relative distance to the temporarily preferred relative distance using a second distance resolution, which is higher than the first distance resolution, while respective further highest pixel intensity values are captured at the same time as respective focus metrics at respective, further relative distances. Preferably there is a detection of the presence of a local maximum on the basis of the further highest pixel intensity values and a determination of the preferred, final relative distance as the relative distance at which the local maximum is present.

Further, a microscopy system for recording a microscopic fluorescence image of a sample region containing a biological sample is proposed. The microscopy system comprises a sample holder for holding the sample region that has at least one boundary surface, further a laser source for generating a laser beam, an excitation light source for emitting excitation light onto the sample region, at least one objective that is embodied to direct the laser beam on the sample region and further effectuate focusing of the laser beam in a focusing plane, and an image sensor for capturing a set of pixel intensity values that are effectuated on corresponding sensor pixels of the image sensor by the laser beam that was reflected at the boundary surface and transmitted back through the objective.

The objective and the sample region are displaceable relative to one another along an optical axis of the objective in order to alter a relative distance between objective and sample region.

The microscopy system further comprises a processor. The processor is embodied to actuate the objective and/or the sample holder in such a way that the objective and the sample region have respective, different relative distances from one another. The processor is further embodied to capture a respective set of pixel intensity values for a respective relative distance by means of the image sensor and further determine a respective focus metric on the basis of the respective set of pixel intensity values. The processor is further embodied to determine a preferred relative distance on the basis of the determined focus metrics. The processor is further embodied to actuate the objective and/or the sample holder in such a way that the preferred relative distance is set, further activate the excitation light source and capture the microscopic fluorescence image by means of the image sensor.

The microscopy system is characterized in that the image sensor is a photosensor with a colour filter matrix disposed upstream thereof, in that the microscopic fluorescence image is a colour image, in particular a non-monochrome colour image, and in that the laser beam has a wavelength in the near infrared range.

Further, a processor is proposed, comprising one or more interfaces. Via the one or more interfaces, the processor is embodied to provide a first control signal for activating a laser light source, provide a second control signal for actuating an objective and/or a sample holder such that the objective and the sample holder have respective, different relative distances from one another, and receive, from an image sensor with a colour filter matrix disposed upstream thereof, a respective set of pixel intensity values for a respective relative distance. The processor is further embodied to determine a respective focus metric on the basis of the respective set of pixel intensity values and determine a preferred relative distance on the basis of the determined focus metrics. Via the one or more interfaces, the processor is further embodied to provide the second control signal or a further control signal for actuating the objective and/or the sample holder in such a way that the preferred relative distance is set, further provide a third control signal for activating an excitation light source and receive pixel intensity values from the image sensor. The processor is further embodied to determine a microscopic fluorescence image on the basis of the received pixel intensity values, wherein the microscopic fluorescence image is a colour image and wherein the laser light source has a wavelength in the near infrared range.

FIG. 1 shows a microscopy system or an apparatus V, in which a sample region P is provided on an object carrier OT. The sample region P comprises a biological sample. The sample region P is held in a sample holder PH, which is preferably attached to a stage TI that is displaceable in the z-direction or in its height. The stage TI and the sample holder PH can be considered to be a combined unit or combined sample holder PH, TI.

In a Z-direction, the sample holder PH is displaceable towards an objective OB along an optical axis OA of said objective. The objective OB can also be referred to as an optical unit OE.

In the example illustrated here, the sample holder PH, TI is displaceable in relation to the objective OB. Alternatively, the objective OB can also be displaceable in relation to the sample holder PH, TI. The displaceability relates to setting a relative distance between sample region P and objective OB. Expressed differently: the objective OB and sample region P or the sample holder PH, TI are displaceable relative to one another along the optical axis OA of the objective OB in order to alter a relative distance between the objective OB and sample region P.

The sample region P has at least one boundary surface.

Figure 2:
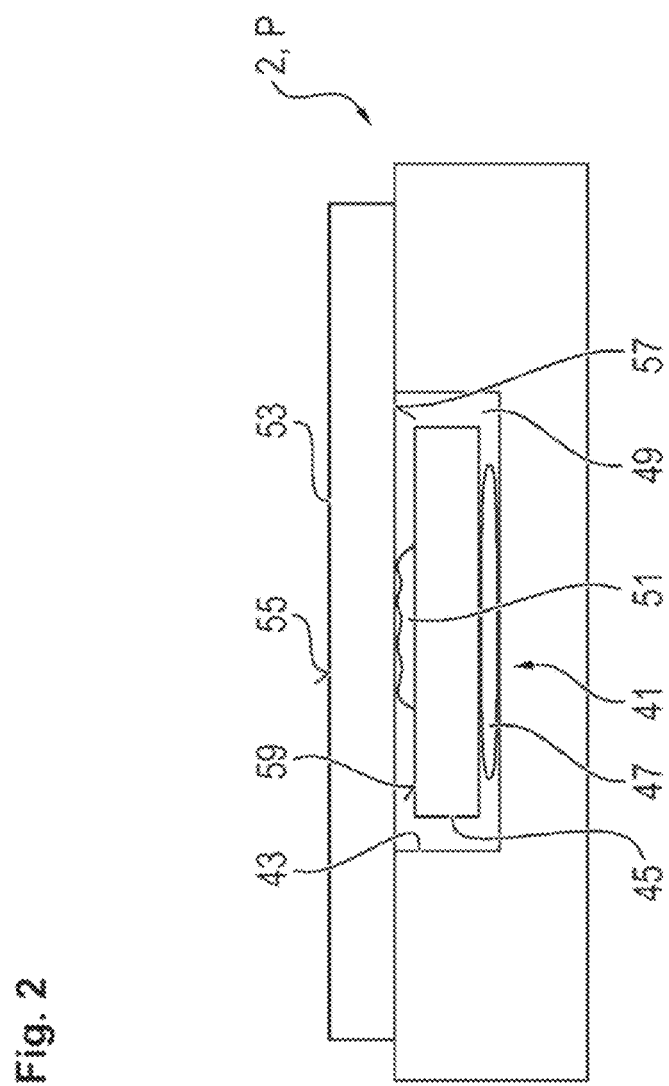
FIG. 2 shows an exemplary sample region containing a biological sample.

FIG. 2 shows the sample region 2, P in detail. The sample region 2 comprises an object carrier with an embedded biochip, as illustrated in greater detail in a schematic side-sectional view in FIG. 2. The sample region 2 comprises an object carrier 41, which has a plate-shaped structure with a cut-out 43. A biochip 45 is disposed in the cut-out 43 of the object carrier 41 and said biochip is attached to the object carrier 41 by means of an adhesive 47. Glycerol 49 is filled in around the biochip 45 within the cut-out 43. A (biological) sample 51 is applied to the biochip 45. Consequently, the sample 51 is embedded in the glycerol 49. A coverslip 53 covers the cut-out 43 with the sample 51, surrounded by glycerol 49, contained therein. The coverslip 53 has an upper surface 55, which forms a first boundary surface, and a lower surface 57, which forms a second boundary surface. The surface 59 of the biochip 45 forms a third boundary surface. In particular, this third boundary surface 59 is determined in a focusing method according to one embodiment of the present invention.

The preferred relative distance (relative vertical distance between the objective and the sample region) is assumed when the laser beam is focussed on the surface 59 (i.e., the third boundary surface) of the biochip 45 by way of the objective. As soon as this preferred relative distance has been found, it is possible to record one or more images by reading the detection area, preferably the entire detection area, of the image sensor, particularly when the sample 51 is illuminated by fluorescence-exciting light, for example.

The sample region can be a sample region that extends in three dimensions, said sample region consequently extending in two lateral directions and extending in a depth direction perpendicular thereto. In particular, a (biological) sample can be situated within the sample region at a certain depth, the intention being to record a focussed image, more particularly a fluorescence image, of said sample. The method (and the microscopy system) can consequently be used, in particular, in autoimmune diagnostics for evaluating immunofluorescence preparations. In particular, the method and the microscopy system can assist an indirect immunofluorescence test (IIFT). The method can ensure quick processing of the samples to be diagnosed, which requires fast focusing on the samples.

The at least one boundary surface can be, e.g., a planar boundary surface, for example between a solid material and air, between a solid material and a liquid or between a solid material and an (organic) sample. The presence of the at least one boundary surface can simplify focusing or increase the reliability of the focusing.

According to one embodiment of the present invention, the method is embodied in such a way that at least one boundary surface, more particularly two boundary surfaces, do(es) not adjoin air, wherein the sample region comprises, in particular, an organic sample that rests on a biochip, is embedded in a liquid substance and is covered by a coverslip, wherein, further, the upper side of the coverslip, in particular, forms a first boundary surface, wherein the lower side of the coverslip forms a second boundary surface, and wherein the surface of the biochip forms a third boundary surface. By way of example, the organic sample can comprise a histological sample, which, for example, is stained and/or provided with one or more fluorescence marker(s) or fluorescence molecule(s). The fluorescence markers or fluorescence molecules can be attached to predetermined sites or receptors or antigens on the organic sample. By way of example, the liquid substance may comprise glycerol. By way of example, the organic sample can be a wet organic sample, it being possible to prevent the sample from desiccating. Embodiments of the invention allow imaging of an organic sample that is embedded in a liquid (in three-dimensional fashion, i.e., substantially from all sides). The boundary surfaces can be characterized by a change in the refractive index above and below the boundary surface. By way of example, the refractive index may change less when passing through a boundary surface between a liquid medium and a solid medium than when passing through a boundary surface from air to a solid medium, for example glass. The reflectivity at the boundary surface can be lower, the smaller the change in the refractive index at the boundary surface. Despite a relatively low reflection at the third boundary surface, the latter can be detected by the method according to the invention.

According to FIG. 1, the apparatus V comprises a laser light source or laser source LL, which generates laser light or a laser beam LS. The laser beam LS is steered in the direction of the objective OB via a beam splitter SP2 and enters an optical aperture OF of the objective OB. In particular, the laser beam is a substantially collimated, parallel bundle of rays. In particular, the beam splitter SP2 is a beam splitter that reflects a first power component of incident light and transmits a second power component of the incident light.

Laser light that is reflected back at the boundary surface of the sample region P is then reflected through the objective OB, through a dichroic beam splitter SP1 and an optical filter FI2 and the beam splitter SP2 to a lens or tube lens TL. Together with the objective, the tube lens TL effectuates imaging of the laser beam on an image sensor BS, which is a photosensor PS in particular. Disposed upstream of the image sensor BS is a colour filter matrix FFM. The image sensor BS and the colour filter matrix FFM arc preferably a constituent part of a camera K, which preferably comprises a camera optical unit KO.

The objective OB is embodied in such a way that it projects laser beams onto a point of a focal plane of the objective on the other side of the objective, wherein the point may be the focus or a point offset from the focus in the focal plane should the bundle of rays not extend precisely parallel to the optical axis of the objective, said laser beams entering into the optical aperture OF of said objective facing the laser light source LL in parallel fashion as a parallel beam path or a collimated, parallel bundle of rays. Laser beams which are reflected in the focal plane by precisely this point, in particular the focus, and which enter back into the objective from said location are, once again, formed into a parallel beam path on the aperture side of the optical side OF towards the image sensor BS.

By way of example, if the laser beam LS thus is a collimated, parallel bundle of rays, the objective OB generates a projection of the laser beam, with the entire intensity thereof, at the one point, more particularly the focus, in the focal plane of the objective. The beam path captured by the objective from this point, more particularly from this focus, said beam path being collimated on the other side of the objective to form a parallel, collimated beam path, can then be projected on an imaging point by means of a lens TL, preferably a tube lens, disposed downstream of the objective OB, the image sensor BS being disposed at said imaging point. Expressed differently: the objective OB and the tube lens TL effectuate imaging of the reflected laser beam on the image sensor BS.

Within the meaning of this application, the term focal plane can also be referred to as the term focal length plane. In particular, a cross-sectional diameter of the laser beam LS substantially equals the entrance aperture of the objective OB. The entrance aperture can also be referred to as aperture.

The objective OB may comprise one or more lenses, which may be disposed in succession along the optical axis of the objective. By way of example, the objective can provide a 10-fold, 20-fold or, for example, 40-fold magnification and may have a numerical aperture of between 0.3 and 0.8 in exemplary fashion. The diameter of the parallel, collimated laser beam is preferably dimensioned such that the full aperture of the microscope objective is illuminated.

In the case where the laser beam LS is a parallel, collimated beam path, the laser beam is then thus projected through the objective OB onto the one point in the focal plane, wherein the point may be the focus or a point offset from the focus in the focal plane. As a result of this, a maximum optical intensity of the laser beam is present at this point in the focal plane. Then, in this case or this example, the focusing plane and the focal plane coincide. If the boundary surface of the sample region is situated precisely at the focal plane as a result of a modification in the relative distance, the laser beam projected on the point in the focal plane is reflected back to the objective OB, wherein the objective OB and tube lens TL then effectuate an imaging of this reflection on the point of the image sensor BS. Then, at least one pixel or a small number of pixels with a particularly high intensity will be situated in one region of the image sensor.

Figure 3A:
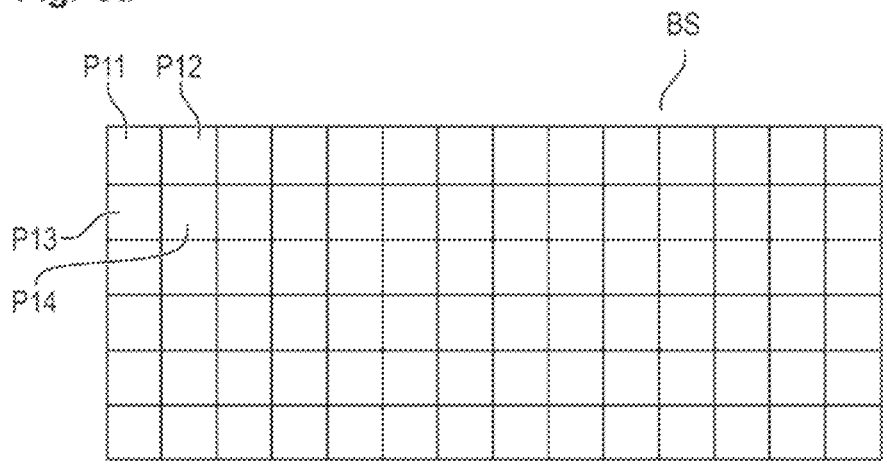
FIG. 3a shows an image sensor.

The image sensor BS is shown yet again in FIG. 3A. The image sensor BS has different individual pixels P11, . . . , P14.

Figure 3B:
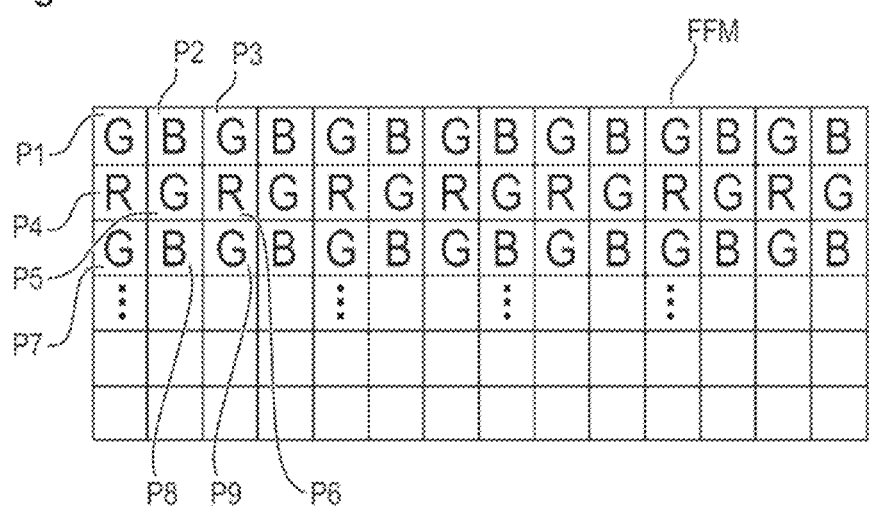
FIG. 3b shows a colour filter matrix.

Disposed upstream of the image sensor there is a colour filter matrix FFM from FIG. 3b. Individual colour filter elements or colour channel elements P1 to P9 are likewise illustrated. A respective colour channel is set by a respective certain colour choice, wherein this is an RGB colour filter matrix in this exemplary embodiment.

Alternatively, a CMYK colour filter matrix is conceivable. By way of example, the matrix element P1 is disposed upstream of the pixel P11 of the image sensor BS of FIG. 3. By way of example, the colour filter element P5 is disposed upstream of the pixel element P14 of FIG. 3a. Preferably, one respective colour filter element, more particularly exactly one respective colour filter element, of the colour filter matrix FFM is disposed upstream of, or assigned to, a respective pixel element of the image sensor BS in each case.

Obtaining a colour image by means of an image sensor BS from FIG. 3a with a colour filter matrix FFM from FIG. 3b disposed upstream thereof can be implemented by way of a so-called debayering method.

According to FIG. 1, the apparatus V further comprises an excitation light source AL for emitting excitation light AS. This excitation light AS is preferably filtered once again by an optical filter FI1 before it is directed to the objective OB by means of the dichroic beam splitter SP1 and hence directed towards the sample region or on the sample region. This excitation light serves to excite fluorescence in the sample region P. The excitation light source is preferably an LED, by preference a blue LED.

Fluorescence radiation FS from the biological sample can then reach back to an optical filter FI2 from the sample region P, through the objective OB and the beam splitter SP2. The optical filter FI2 preferably filters out light from the excitation radiation AS. The fluorescence radiation FS then passes through the beam splitter SP2 and, from there, it reaches the tube lens TL, which, together with the objective OB, effectuates imaging on the image sensor BS and the colour filter matrix FFM disposed upstream of the sensor. The combination of the optical filter FI1, the optical filter FI2 and the dichroic beam splitter SP1 can also be referred to as an optical unit OE2.

Expressed differently: the objective OB is embodied to direct the laser beam on the sample region and effectuate focusing of the laser beam in a focusing plane. The image sensor BS is embodied to capture a set of pixel intensity values, which are effectuated by the laser beam, reflected at the boundary surface of the sample region P and transmitted back through the objective, on corresponding sensor pixels of the image sensor, wherein the laser beam is imaged on the image sensor BS not only by the objective OP but precisely preferably also still by the lens or tube lens TL.

According to one embodiment, a lens TL, more particularly a tube lens, is disposed in a detection beam path between the objective OB and the detection area, said lens imaging a focal plane of the objective on the image sensor. A parallel beam path may be present behind (or downstream in the light path of) the objective and the parallel beams can be imaged into an image-side focal plane by the tube lens.

Consequently, a displacement of the objective relative to the tube lens has no influence, or no substantial influence, on the imaging of the parallel beams into the image-side focal plane of the tube lens. Consequently, only beams that were emitted in different directions from a certain, common point in the focal plane of the objective, more particularly the focus, reach a certain point within the portion of the detection area. By way of a suitable choice of the size of the predetermined area, it is consequently possible to preclude stray light (which has not emerged in different directions from a point in the object-side focal plane of the objective) from the detection to the focusing.

The image sensor BS is a photosensor, more particularly a CMOS sensor or a CCD sensor. The colour filter matrix FFM is preferably a Bayer matrix.

The colour filter matrix FFM preferably comprises a plurality of colour channels, more particularly at least a green channel and a red channel, particularly preferably furthermore a blue channel.

The apparatus V of FIG. 1 comprises a processor P, which can actuate the sample holder PH, TI by means of a control signal ST4 via an interface SC4 such that the objective OB and the sample region P have respective, different relative distances from one another.

By means of an interface SC2, the processor P is embodied to transmit a control signal or a plurality of control signals ST2 to the camera K or the image sensor BS such that pixel intensity values PW or sensor values SW are captured by the image sensor. Then, the image sensor BS provides these pixel intensity values PW or sensor values SW to the processor P via the interface SC2. As a result of this, the processor P therefore captures a respective set of pixel intensity values for a respective relative distance by means of the image sensor BS. Thus, the processor P can continuously or gradually displace the sample holder PH, TI and then capture a respective image or a respective set of pixel intensity values for respective relative distances between objective OB and sample region P. Thus, a dedicated, respective set of pixel intensity values is captured as an image or, preferably, as a partial image of the image sensor for a respective relative distance. For a respective relative distance, the processor P determines a respective focus metric on the basis of the respective set of pixel intensity values or on the basis of the respective image for the respective relative distance.

Preferably, the relative distance between sample region P and objective OB can alternatively be set by the processor P by virtue of the processor P actuating the objective OB by means of a control signal ST6 via an interface SC6 in such a way that the objective OB changes its relative distance along the optical axis OA of the objective OB in relation to the sample region P.

The processor P can activate or deactivate this laser light source LL via a control signal ST7 by means of an interface SC7.

The processor P can activate or deactivate the excitation light source AL via a control signal ST3 by means of an interface SC3.

The processor P determines a preferred relative distance between objective OB and sample region P on the basis of the determined focus metrics.

The processor P then actuates the objective OB and/or the sample holder PH in such a way that the preferred relative distance is set, that, further, the excitation light source AL is activated and that, further, the microscopic fluorescence image is captured as a colour image by means of the image sensor BS.

Here, capturing the microscopic fluorescence image as a colour image is effectuated by the processor by virtue of the processor P receiving the pixel values PW or sensor values SW of the image sensor BS via the interface SC2 and generating a corresponding colour image on the basis of these pixel values.

The processor P need not be an integral component of the apparatus V: it may be logically separated from the apparatus, as plotted in FIG. 1 by way of a logic separation TR. In this case, the interfaces SC2, SC7, SC3, SC6, SC4 may be combined in full or in part as one or more data interfaces, in particular wired or non-wired, i.e., wireless, data interfaces, in particular in the form of a local area network (LAN) interface.

Preferably, the processor P has an interface SC1 to a network N. The network N is preferably a data network, such as the Internet, for example.

Via the interface SC1, the processor P can preferably receive an input signal ES from the network N, said input signal indicating to the processor P a request for carrying out the proposed method in order to bring about focusing and capture the fluorescence image as a colour image.

Preferably, the processor P has an interface SC5 to an output unit, by means of which the processor can provide image data BD. The output unit AE can then be a monitor or display, for example, such that the image data BD can be, e.g., digital image data according to the HDMI standard. Other image data standards are possible. The output unit AE can, in turn, be a network interface in one embodiment, by means of which the processor transmits the image data BD in digital form to a network by means of the interface SC5. In the case where the output unit AE is a network interface, the interface SC5 and the interface SC1 can also be provided in the form of an integral or equivalent interface.

FIG. 4e shows an overall image of the punctiform laser reflection, as was recorded by the entire area of a greyscale value image sensor without a colour filter matrix disposed upstream thereof, for a wavelength of 650 nm. The overall image 63 comprises 1024×1024 pixels, for example.

Preferably, only a portion of the image sensor or the pixels are read while the relative distance between the objective OB and the sample region P is modified.

In this respect, FIGS. 4a, 4b and 4c illustrate exemplary portions 65a, 65b, 65c and the pixel intensity values or intensities, detected from the pixels contained therein, as greyscale values of an image of a reflected laser beam for different relative distances. By way of example, the portions 65a, 65b, 65c can be formed by 16×16 pixels. The pixel intensity values of the pixels of the portion 65a then correspond to a set of pixel intensity values for one relative distance. An analogous statement applies to regions 65b and 65c for different relative distances. Thus, FIGS. 4a, 4b and 4c illustrate pixel intensities or images which arise at z=−0.5 µm, z=0 µm and z=0.5 µm relative to the relative distance between objective and sample region, wherein the surface 59 of the biochip 45 is disposed in the focal plane of the objective such that the relative distance to be determined is assumed for z=0 µm. The respective highest intensity value Gmax is likewise illustrated. If the focal plane of the objective is moved away from the corresponding boundary surface in the object carrier (see FIGS. 4a, 4c), the laser signal is imaged in attenuated or broadened fashion. It is evident from FIGS. 4a, 4b and 4c that the saturation of the individual pixels already significantly reduces in the case of displacements of approximately +/−500 nm; i.e., the highest pixel intensity over the portion is greatest when precisely the preferred relative distance is adopted, i.e., in the case of FIG. 4B. By using the system described here, with focusing of the laser beam on a focus in the focal plane of the objective, it is possible to obtain a particularly accurate spatial resolution of the z-position. Were a spatially extensive and overall pattern to be projected onto a plurality of pixels of the portion, this pattern would have a greater spatial extent than the laser beam used in this case, even in the ideal focusing position, and so a spatial resolution in the z-direction would be coarser or less accurate. By way of example, if the respective highest pixel intensity value is used as a focus metric, the following further advantages arise: In the case of a pattern projection, it would not be sufficient to consider only a single highest pixel intensity of the portion as a measure for focusing; instead, a plurality of pixels would have to be combined and focusing in respect of the extensive pattern would have to be determined as a measure for focusing by way of a common analysis of the plurality of pixels, the latter evidently being more time-consuming than the consideration of the highest or maximum pixel intensity of the image sensor or a portion thereof.

FIG. 4d illustrates, in exemplary fashion, a preferably used predetermined area or a portion 66, in which intensity values are captured and evaluated in order to preferably determine a highest or maximum pixel intensity value for this region (65a, 65b, 65c).

Thus, preferably the highest pixel greyscale value or the highest intensity value can be determined for each partial image recorded for a certain relative distance. By way of knowledge of the request signal ST4 for the stage apparatus TI 37, the processor P is able to link the camera data or intensity values to the associated relative distances and further determine the preferred relative distance.

The reflections of a laser beam as pixel values of an image sensor illustrated in FIGS. 4a, 4b, 4c and 4e are illustrated for the case where no colour filter matrix has been disposed upstream of the image sensor and hence there is precisely no change in pixel intensity of the reflected laser beam at a wavelength of 650 nm by way of different portions of a colour filter matrix.

Figure 7A:
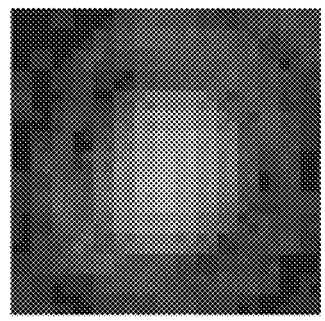
FIGS. 7a and 7b show pixel images of a reflected laser beam, captured by means of an image sensor, when using a wavelength in the near infrared range.
Figure 7B:
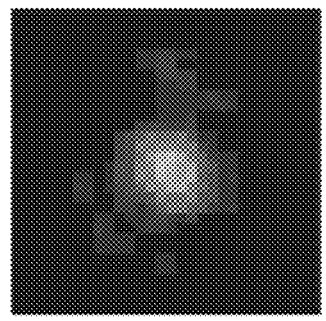
Figure 7C:
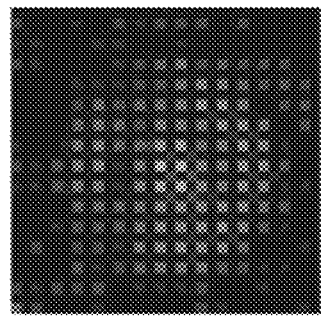
FIGS. 7c and 7d show arising pixel images when capturing a reflected laser beam at a wavelength of 650 nm when using an image sensor with a colour filter matrix disposed upstream thereof.
Figure 7D:
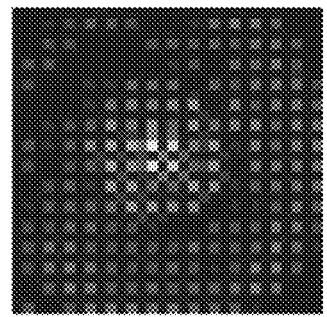

FIGS. 7c and 7d show arising exemplary pixel intensity values in the case where a laser wavelength of 635 nm is used when using an image sensor with a colour filter matrix disposed upstream thereof. FIG. 7c shows an arising intensity distribution over the pixel range for the case of slight defocusing. It is clearly evident that an expected intensity is not provided for all pixels but that certain pixels are virtually masked since these pixels are situated behind colour filter elements not assigned to a red channel and said colour filter elements consequently do not sufficiently transmit light at a wavelength of 635 nm.

FIG. 7d shows pixel intensity values arising when using an image sensor with a colour filter matrix disposed upstream thereof for the case of focusing. In contrast with FIG. 4b, an obvious point with a high intensity of the reflected laser light is not visible here: instead, individual pixels are virtually masked here, too, in FIG. 7b. Such masking of certain pixels within the scope of detecting resultant pixel intensity values as a representation of a reflected laser beam can have a negative effect on focus metrics to be determined. Expressed differently: the arising pixel intensity values of FIGS. 7c and 7d are subject to artefacts that are caused by the different transmissivity values of the different colour channels of the colour filter matrix. These artefacts have an influence on the focus metrics to be determined, and so a determination result of the preferred relative distance may be made more difficult or falsified. The final result then need not may be that there is not sufficient focusing for capturing the fluorescence image.

An exemplary focus metric can be a highest or maximum pixel intensity value within a portion as illustrated in FIG. 7c or 7d. Alternative focus metrics, specified here, could, for example, be based on one or more of the following operators: weighted mean value of the pixel intensities in the selected image region, evaluating the full width at half maximum of the pixel intensities, evaluating a maximum or mean value of the edge figure of the pixel intensities. In particular, an edge figure can be obtained by means of one of the following operators: Prewitt operator, Sobel operator, Laplacian-of-Gaussian/Marr-Hildreth operator or difference-of-Gaussian. Such operators are particularly susceptible or sensitive to artefacts, as can be seen in FIGS. 7c and 7d.

FIG. 7a and FIG. 7b show arising pixel intensity values in the case where a laser in the near infrared range is used when using the image sensor and colour filter matrix from FIG. 1, in particular a laser at 850 nm. An expected distribution of the pixel intensity is clearly visible for the case of slight defocusing in FIG. 7a, as already shown previously in FIG. 4a. Here, a focus metric can now be determined robustly and reliably.

FIG. 7b shows a sharply reflected laser beam with a strong intensity in the mid-range for the case of almost precise focusing, as already shown previously in FIG. 4b in a similar configuration.

The solution according to the invention using the image sensor and the colour filter matrix disposed upstream thereof allows respective images or respective sets of pixel intensity values, as shown in FIGS. 7a and 7b, to be obtained at the respective relative distances on account of the choice of the wavelength of the laser beam in the near infrared range and allows respective focus metrics to be determined reliably and robustly for respective relative distances on the basis of the respective images or respective sets of pixel intensity values.

Problems with a lack of alignment of the reflected laser beam in relation to portions of the colour filter matrix may arise, in particular, if the sample region P is not aligned completely perpendicular in relation to the optical axis OA of the objective OB of FIG. 1. What may arise in such a case where the sample region P is slightly tilted in relation to the optical axis OA of the objective OB is that the back-reflected laser beam LS, which is guided to the image sensor BS, is slightly at an angle in relation to the plane of the colour filter matrix FFM.

If the relative distance between the sample region P and the objective OB is then altered in piecewise fashion or gradually or else continuously, what may arise is that the laser beam LS strikes the colour filter matrix FFM in such a way that the laser beam in each case strikes different portions P1 . . . , P9 for different relative distances and then said laser beam is transmitted to a different extent, precisely depending on the respective relative distance set between the objective OB and sample region P, by the different portions P1 . . . , P9 of the colour filter matrix FFM.

This is compensated by the invention by virtue of the fact that an image sensor BS with a colour filter matrix FFM disposed upstream thereof precisely still is usable since the laser is chosen with a wavelength in the near infrared range.

Figure 8:
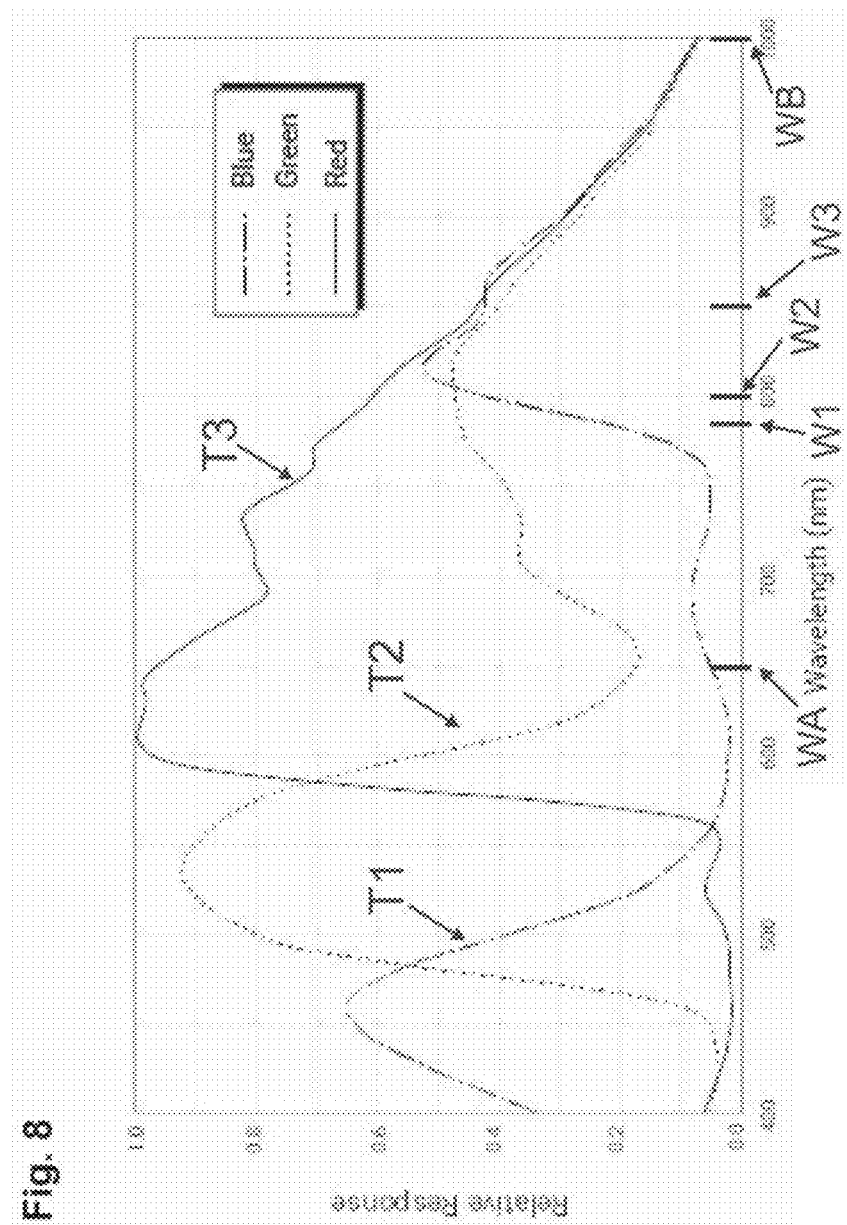
FIG. 8 shows a transmissivity of different colour channels of an exemplary colour filter matrix.

FIG. 8 shows transmissivity values T1, T2, T3 for respective colour channels of an exemplary colour filter matrix. The transmissivity T1 shows a blue channel, the transmissivity T2 shows a green channel, the transmissivity T3 shows a red channel.

The image sensor with a colour filter matrix used here is preferably a SONY IMX250-type sensor.

A wavelength WA of 650 nm is plotted. At this wavelength WA, colour filter elements such as the element P8 of FIG. 3b are not transmissive enough, and so a separate image sensor in a separate red channel would have to be used at this wavelength WA of the laser if use is made of an image sensor BS with the colour filter matrix FFM disposed upstream thereof.

This is avoided by the invention since the wavelength of the laser used is in a range above the wavelength W1 of 780 nm, preferably above the wavelength range W2 of 800 nm up to the wavelength W3 of 1000 nm. As is evident from FIG. 8, the transmissivity of colour filter elements in the respective colour channels is high enough, particularly above the wavelength range W2, such that images of reflected laser beams, as illustrated in FIGS. 7a and 7b, can still be determined by means of a scaling, yet to be explained in more detail below, of the pixel intensity values or a scaling of the individual colour channel information items. The use of the wavelength of 850 nm in the wavelength W3 of FIG. 8 is particularly advantageous since scaling of individual colour channel information items may possibly be dispensed with here as the transmissivity differences of the individual colour channels are sufficiently small.

Capturing a respective set of pixel intensity values for a respective relative distance is preferably implemented by way of capturing respective subsets of pixel intensity values of respective colour channels, wherein the respective set of pixel intensity values is determined on the basis of the subsets. The image sensor preferably provides a respective subset of pixels or a respective subset of pixel intensity values for each colour channel, wherein the two-dimensional spatial positional orientation is also specified for each pixel or each pixel intensity value. Consequently, the processor of FIG. 1 can determine or compose the set of pixel intensity values from the subsets. Here, the processor can provide a corresponding scaling factor for a respective colour channel, in particular by means of a memory unit, such that pixel intensity values of a subset of a certain colour channel are initially multiplied by the determined scaling factor assigned to the colour channel before the processor then determines or composes the set of pixel intensity values from the subsets. Thus, pixel intensity values of a respective subset are weighted by a predetermined scaling factor, the latter depending on the type of colour channel to which the respective subset of pixel intensity values belongs. This allows transmissivity differences between the individual colour channels of the colour filter matrix at the wavelength of the laser to be compensated.

Preferably, the highest intensity value from a portion of the image sensor can be used as a focus metric. Thus, preferably, the highest intensity value within the portion can simply be focussed on in a portion of the image sensor in a preferred manner in order to obtain a focus metric or a measure for the focusing of the sample region. Then, in this preferred case, there is no need for further processing or filtering of the possibly many pixel intensity values of the image sensor or of a portion of the image sensor on account of the use of the highest pixel intensity value described here: instead, all that needs to be determined is the highest intensity value, corresponding to the corresponding relative distance, within the image sensor or the considered portion. Here, which pixel has detected the maximum value of intensity values is irrelevant, and so the method is particularly fast. If the sample region is displaced further in relation to the objective to another relative distance, a reflection of the laser beam is not implemented at a single point, which previously was the point in the focal plane and, in particular, the focus, but the reflection is implemented instead in an extensive region of the sample region or the boundary surface. Then, as a result thereof, the optical intensity of the laser beam is thus distributed over a larger region of the portion than would be the case if the laser beam is reflected only at a single point of the focal plane. Therefore, intensity values then even also arise within the portion on the image sensor, said intensity values in sum still representing or being able to represent the overall optical intensity of the laser beam, wherein, however, the now highest intensity value precisely is even lower than the highest intensity value in the configuration where the laser beam is reflected at exactly the one point of the focal plane by means of the boundary surface. Thus, by evaluating the portion or the pixels thereof, it is not necessary to focus on accurate filtering of a reflected pattern, e.g., by means of a stop; instead, the evaluation of the highest intensity value for a respective relative distance allows particularly simple and fast focusing or determining of the reference relative displacement position with particularly high spatial resolution. In the case where a plurality of boundary surfaces is present, a third boundary surface may then be detected, for example, in order to determine a preferred relative distance, by means of the profile of the highest intensity values. Consequently, the sensitivity of the method can thus be increased and an extent of the imaged laser beam in the depth direction can substantially equal a depth of field of the optical unit.

Figure 5:
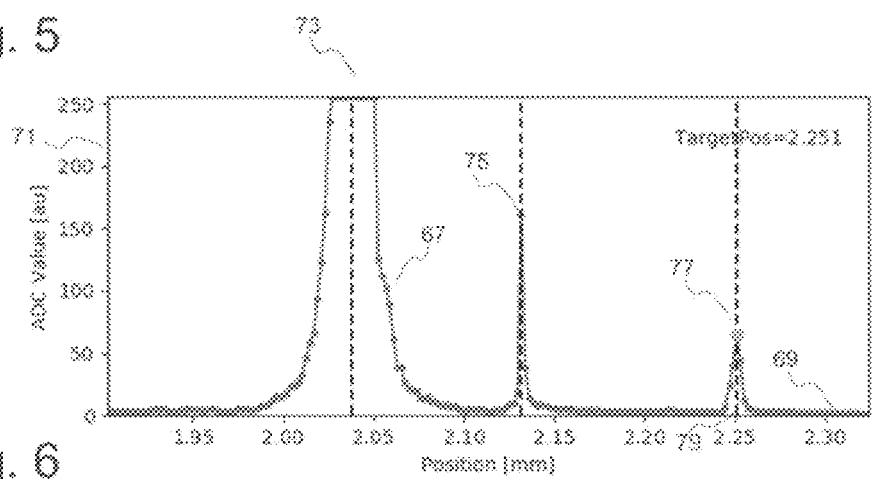
FIG. 5 shows a profile of highest intensity values as a function of a relative distance.

FIG. 5 illustrates an example of a profile 67 of the highest determined pixel intensity values (determined for each relative distance) as a function of the relative distance as a curve 67 in a coordinate system, wherein the relative distance (Z-position) is plotted on the abscissa 69 and the respective highest pixel intensity value in the portion is plotted at the associated relative distance on the ordinate 71. Here, the lowest Z-value indicates the position at which the sample region is situated furthest from the objective; the highest Z-value here indicates the position at which the sample region is situated closest to the objective. Initially, there is a relative displacement of the objective and of the sample region with respect to one another by way of reducing the relative distance between the objective and the sample region with a first distance resolution, from a greatest distance to a smallest distance, wherein the profile of the highest pixel intensity values, which has a plurality of maxima, is determined. In particular, the profile has a first local maximum 73, thereafter a second local maximum 75 and finally a third local maximum 77 of the profile.

The curve 67 exhibits a characteristic signal pattern ("autofocus signal"), which is based on the geometry of the sample region, as illustrated in FIG. 2. Since the structure of the sample region 2 is known, the Z-position of the biochip 45, more particularly the surface 59 of the biochip 45, can be determined from the signal profile 67.

The curve 67 (autofocus signal) has a first maximum 73, which originates from the reflection of the laser beam 19 at the first boundary surface 55 (upper surface of the coverslip 53). Further, the curve 67 has a second maximum 75, which originates from the reflection of the laser beam 19 at the lower surface 57 (second boundary surface) of the coverslip 53. Finally, the curve 67 has a third maximum 77, which originates from the reflection of the laser beam 19 at the surface 59 of the biochip 45 (third boundary surface). The focus position of the biochip surface 59 or the relative distance emerges here from determining the Z-position 79 of the third signal maximum 77.

Figure 6:
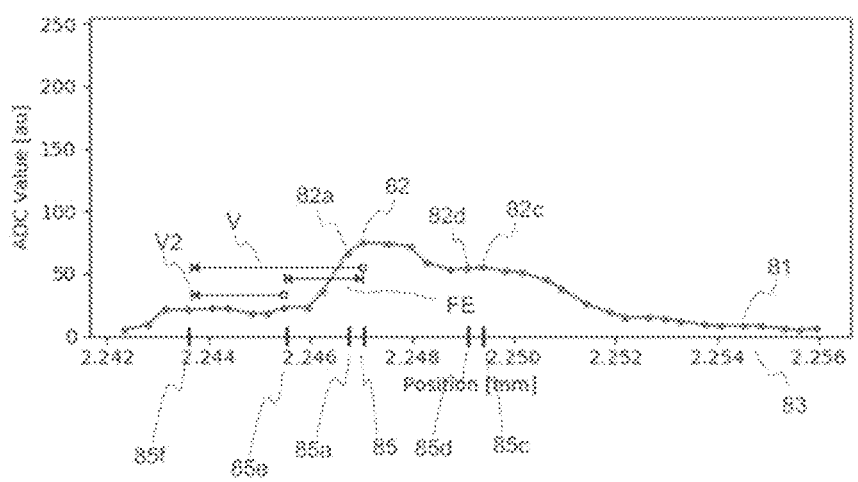
FIG. 6 shows a further example of a local maximum in a profile of maximum values as a function of a relative distance, as determined according to an embodiment of the method.

With the aid of a controller or a processor and a drive means for displacing the objective 3, the objective 3 can subsequently be driven back again in the direction of the determined focus location or the preferred relative distance while the distance between the objective and sample region is increased. Then, in particular, the preferred relative distance is a temporarily preferred relative distance. The driving back is implemented, in particular, using a second distance resolution, which is higher or finer than the first distance resolution. Here, the length of the travel over the autofocus signal is controlled such that there is monitoring and evaluation at the same time as the movement in the Z-direction. Here, respective further highest pixel intensity values are determined at respective, further relative distances and the presence of the maximum 82 from FIG. 6 is detected on the basis of the further highest pixel intensity values. Preferably, then, the final relative distance is set at such a final position at which the local maximum is or was present, the latter being detected on the basis of the further highest pixel intensity values, in the case where the laser beam has a parallel bundle of rays collimated towards the objective and, further, the focusing plane of the laser beam coincides with the focal plane of the objective.

To this end, FIG. 6 illustrates an autofocusing signal which originates from the reflection of the laser beam 19 at the surface 59 of the biochip 45: i.e., a third maximum 82 in a profile at a position 85. The profile 81 of the further highest intensity values in the portion as a function of the Z-position on the abscissa 83 was determined using an objective with 20-fold magnification and a numerical aperture of 0.5, wherein use is made of a laser with an emission wavelength of $\lambda_0$=635 nm.

The axial resolution of this signal 81 could be determined to be approximately 2.1 µm, for example from the full width at half maximum A. The final preferred relative distance 85 can be determined, for example, as the Z-position at which the maximum 82 occurs, or as a centroid of the curve 81 or a centroid of the maximum 82. Then, the objective can be displaced relative to the sample region to the final preferred relative distance 85, at which the maximum 82 of the further highest intensity values was present.

The focus position as the final preferred relative distance preferably counts as reached and the travel movement is preferably stopped if the following conditions are preferably satisfied together:

A previously defined threshold of the autofocus signal was exceeded. This threshold is determined from the signal level of the previously determined autofocus signal.

The autofocus signal reaches a local maximum 82.

However, the surface of the biochip need not represent the optimal imaging plane for the fluorescence microscopy since the layer thickness of the sample 51 may in part be greater than the depth of focus of the microscopy system. Therefore, a plurality of fluorescence recordings may be recorded about the determined focus position or the determined final preferred relative distance. Therefore, a plurality of images of the sample region can preferably be captured by means of the image sensor, proceeding from the final preferred relative distance. In the process, the relative distance between the objective and the sample region is changed along the optical axis to respective relative distances above and/or below the final preferred relative distance. Further, respective images are captured at the respective relative distances by means of the image sensor in this case. Then, the processor stores the respective images and determines respective focus metrics for the respective images. Then, the processor selects the image that has the best focus metric. Preferably, the processor discards the other images, which do not have the best focus metric.

As emerges from FIG. 5, the maxima have signal levels with a specific pattern. From the profile, the third maximum 77 can preferably be recognized as reliably detected, for example, if the signal level of the local maximum 77 is higher than a previously determined or predetermined threshold and if, further, a local maximum is in fact present, i.e., if intensity values to the right and left of the preferred relative distance 79 are lower than the intensity at exactly the preferred relative distance.

Consequently, the preferred relative distance can be determined in reliable fashion, the laser beam being focussed on the surface of the biochip at said preferred relative distance. In order to be able to reliably separate the maxima 73, 75 and 77 from one another, the resolution of the autofocus system approximately equals the depth of field of the microscopy system according to one embodiment of the present invention. By evaluating a maximum pixel intensity, or the highest pixel intensity, it is possible for a high spatial resolution of the focusing method to emerge in the Z-direction.

According to one embodiment of the present invention, the method is embodied in such a way that a relative distance between the objective and the sample region is initially reduced proceeding from a largest distance while intensity values of the pixels of the portion are captured such that, in particular, a first local maximum originating from the reflection of the laser beam at the first boundary surface is detected first, followed by a second local maximum originating from the reflection of the laser beam at the second boundary surface and, finally, a third local maximum originating from the reflection of the laser beam at the third boundary surface. The first local maximum can be a global maximum of the profile of the maxima as a function of the relative distance. If all three (local) maxima are detected in the profile of the maxima as a function of the relative distance, the reliability of the focusing can be improved. By way of example, within the profile of the maxima as a function of the relative distance, a (local) maxima can be determined if a certain threshold in the intensity of the pixels is exceeded. By way of example, the threshold can be derived from the previously detected (local) maximum. The first local maximum can be greater than the second local maximum and the second local maximum can, in turn, be greater than, or substantially the same level as, the third local maximum. If this sequence of maxima is detected, the reliability of the identification of the boundary surfaces, and hence of determining the focus, can be increased. Then, the preferred relative distance is therefore determined on the basis of the third maximum.

Figure 9:
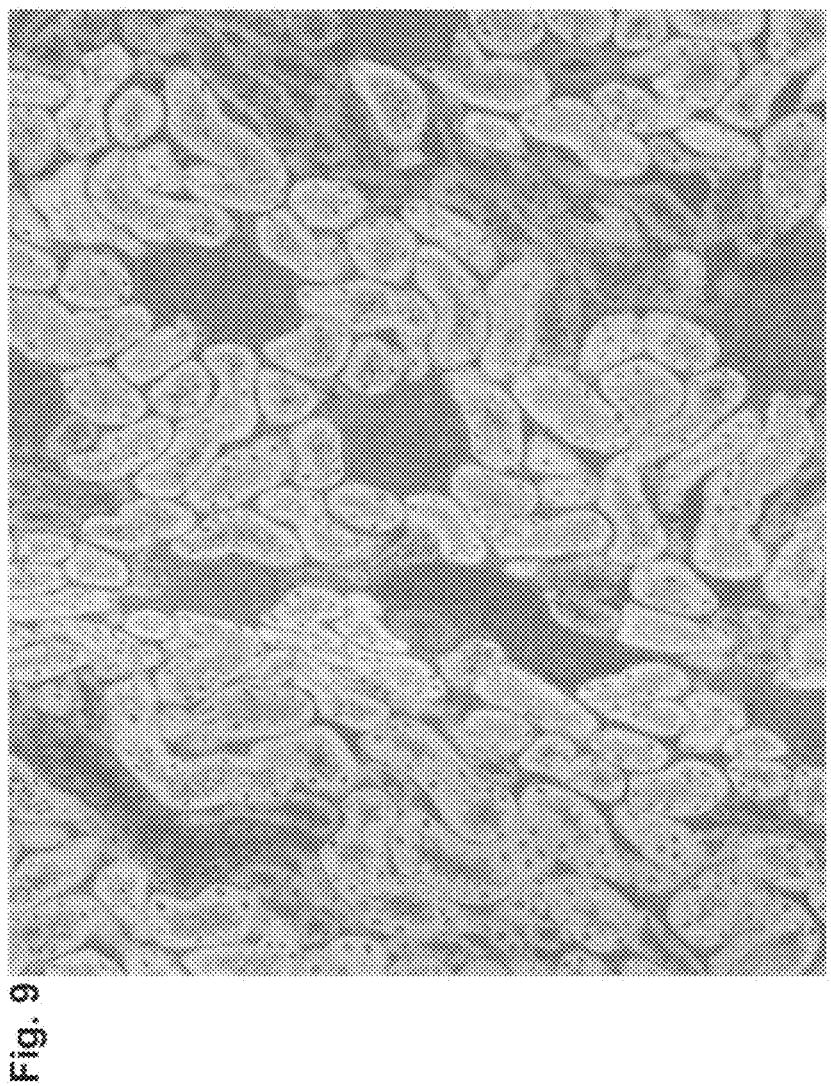
FIG. 9 shows an exemplary fluorescence image of a tissue as a greyscale value image, wherein the intensities of the greyscale value image are based on intensities from a plurality of colour channels.

FIG. 9 shows an exemplary fluorescence image of a tissue as a greyscale value image, wherein the intensities of the greyscale value image are based on intensities of a plurality of colour channels, in particular a green channel, a red channel and a blue channel. Shown is a fluorescence image of a rat kidney following incubation with a patient serum and a secondary antibody, which is marked with a fluorescent dye.

For a user or physician who is to make a diagnosis, it is particularly important to know which brightness value or intensity value originates from which colour region or colour space.

Figure 10:
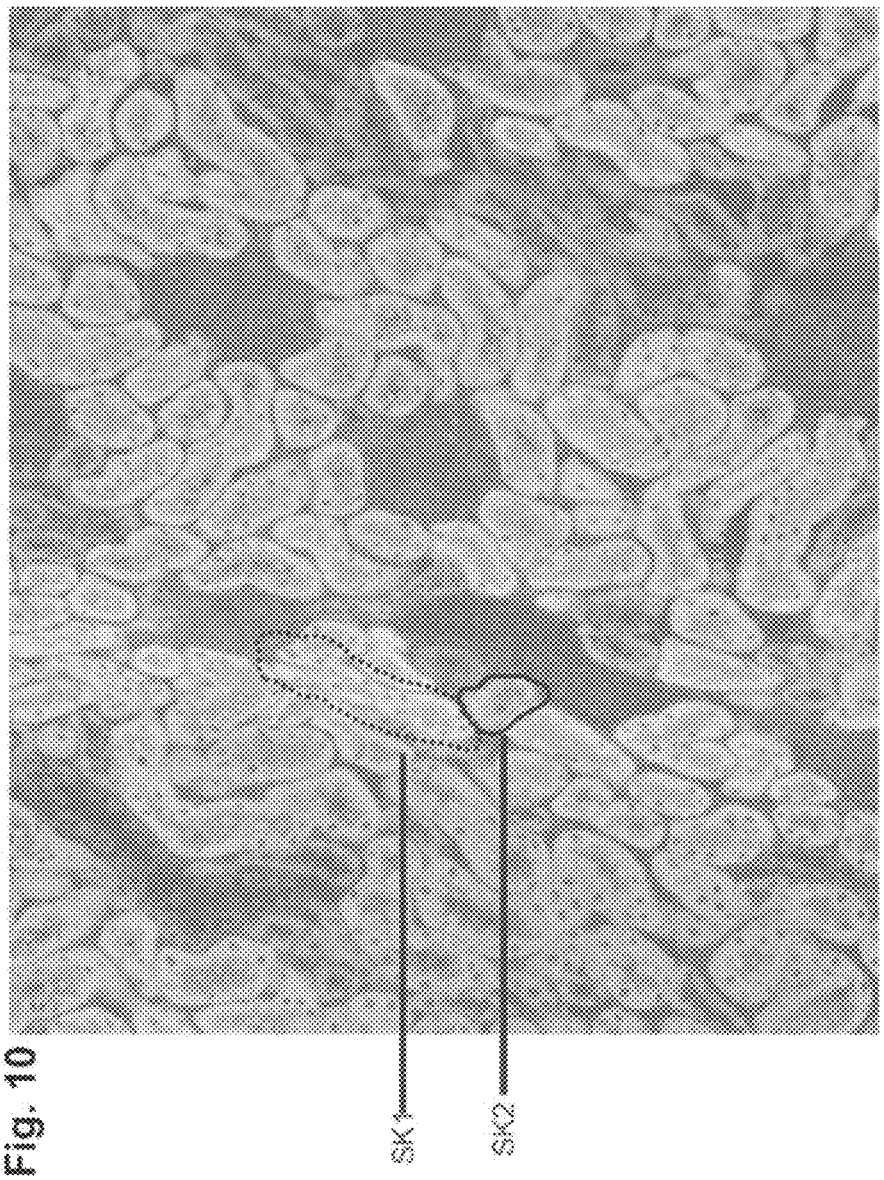
FIG. 10 shows the exemplary fluorescence image with labelling of two tissue structures.

FIG. 10 shows the same fluorescence image as from FIG. 9, wherein, further, two structures SK1, SK2 are plotted with a frame, both of which have a certain brightness or shine to a certain extent.

Such shining may be effectuated, firstly, by the excitation of a fluorescence dye attached to the tissue. As an alternative or in addition thereto, this may also be a so-called autofluorescence of the tissue in a brown or orange range, i.e., with a red component, which is independent from an attachment of fluorescent dyes of the secondary antibody in the tissue. Further, a region of tissue may also shine as a result of the light of the excitation light being reflected by the tissue.

Figure 11:
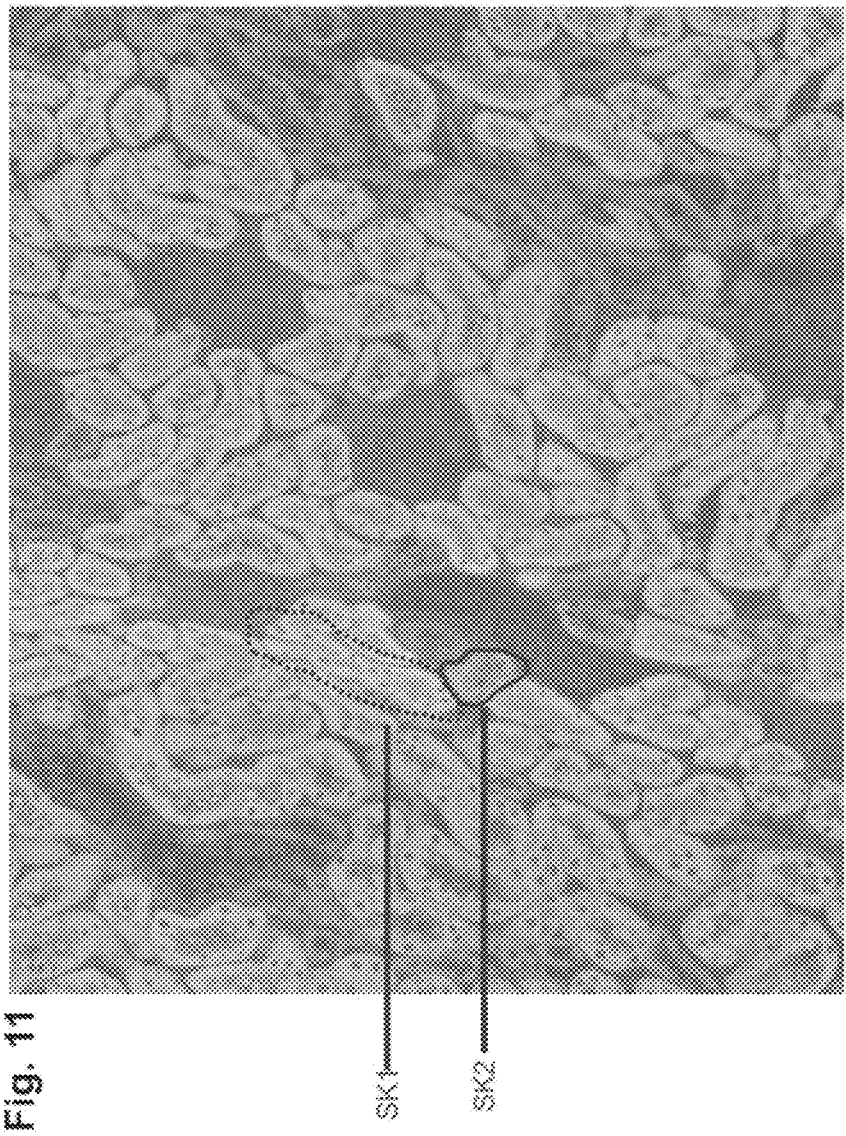
FIG. 11 shows a pure green component of the fluorescence image with labelling of the two tissue structures.

FIG. 11 shows a pure green channel information item of the same image from FIGS. 9 and 10. It is very evident that the structure SK1 shines more strongly in a green channel or with a green component than is the case for the structure SK2.

Figure 12:
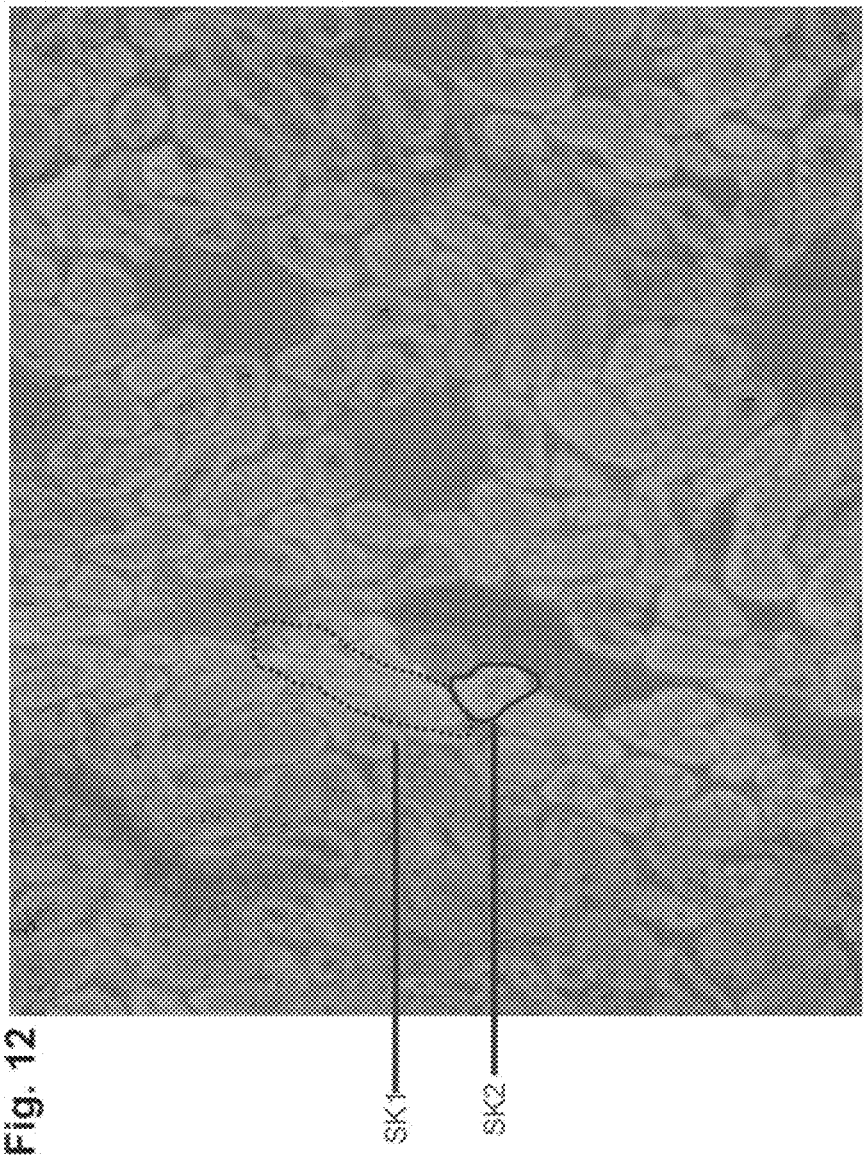
FIG. 12 shows a pure red component of the fluorescence image with labelling of the two tissue structures.

FIG. 12 shows a pure red channel information item of the same image from FIGS. 9 and 10. Here, it is evident that both the structure SK1 and the structure SK2 shine to approximately the same extent in the red channel or with a red component.

Thus, it is evident from this that the structures SK1 and SK2, which shine to a similar extent in FIGS. 9 and 10, come to shine on account of different colour components.

The structure SK1 tends to be dominated by its green component while the two structures SK1 and SK2 shine to approximately the same extent with a red component. Thus, for a person making a diagnosis, it is advantageous to be presented a complete colour information item of a tissue or a fluorescence image as a colour image with a red component and a green component in order then to be able to deduce in the colour image on the basis of the different colours whether the shining or the fluorescence is fluorescence on account of autofluorescence on its own or else autofluorescence together with fluorescence on account of attachment of a specific antibody from the patient serum in conjunction with an attachment of the secondary antibody marked with the fluorescent dye.

Therefore, the method according to the invention and the apparatus according to the invention are particularly advantageous since it is possible to capture, firstly, the fluorescence image as a digital colour image with a green component and a red component by the image sensor and the colour filter matrix and, at the same time, it is also possible, in order to bring about focusing, to capture a reflection of the laser beam by means of the same image sensor with a colour filter matrix disposed upstream thereof without using a further image sensor since the laser has a wavelength in the near infrared range.

Figure 13:
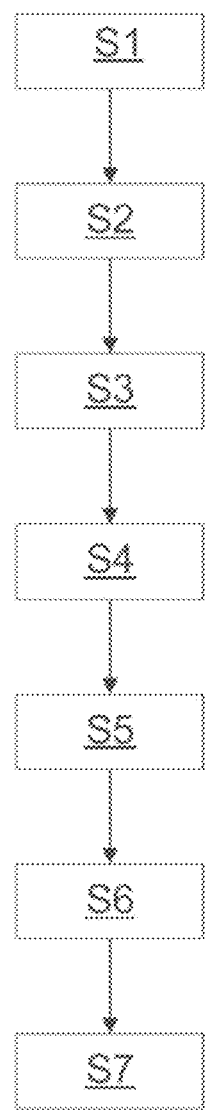
FIG. 13 shows a flowchart for carrying out method steps according to a preferred embodiment.

FIG. 13 shows a flowchart of steps, which the processor carries out according to a preferred embodiment.

In a step S1, the processor provides the control signal ST7 for activating a laser light source. In a step S2, the processor provides the control signal ST4 and/or ST6 for actuating the objective and/or the sample holder such that the objective and the sample holder have respective, different relative distances from one another. In a step S3, the processor captures a respective set of pixel intensity values for respective relative distances by virtue of the processor receiving, for a respective relative distance, a respective set of pixel intensity values from the image sensor with the colour filter matrix disposed upstream thereof.

Preferably, a respective set of pixel intensity values is captured in step S3 by capturing respective subsets of pixel intensity values of respective colour channels for the corresponding relative distance. To this end, the processor receives respective subsets of pixel intensity values of respective colour channels from the image sensor.

Then, the processor determines the respective set of pixel intensity values on the basis of the respective subsets of the respective colour channels by means of colour channel-dependent scaling of the pixel intensity values and by means of composing the set of pixel intensity values from the scaled, respective subsets of pixel intensity values.

In a step S4, the processor determines a respective focus metric for a respective relative distance on the basis of the respective set of pixel intensity values captured or determined for the respective relative distance.

In a step S5, the processor sets the preferred relative distance by way of the control signal ST4 and/or the control signal ST6. In step S6, the processor activates the excitation light source by means of the control signal ST3.

In a step S7, the processor receives pixel intensity values from the image sensor and thus determines or captures the microscopic fluorescence image by means of the image sensor BS.

It should be understood that features that are described, explained or provided individually or in any combination in conjunction with the method for recording an image of a sample region can equally well be applied, individually or in any combination, to a microscopy system for recording an image of a sample region, according to embodiments of the present invention.

Depending on certain implementation requirements, exemplary embodiments of the invention can implement the processor in hardware and/or in software. An implementation of the processor specified here can be implemented as at least one unit, or else by a plurality of units in combination. The implementation can be performed using a digital storage medium, for example a floppy disk, a DVD, a Blu-ray disc, a CD, a ROM, a PROM, an EPROM, an EEPROM or a flash memory, a hard disk drive or any other magnetic or optical memory on which electronically readable control signals are stored, the latter being able to interact or interacting with a programmable hardware component in such a way that the respective method is carried out. A programmable hardware component can be formed as a control unit by a central processing unit (CPU), a computer, a computer system, an application-specific integrated circuit (ASIC), an integrated circuit (IC), a system on chip (SOC), a programmable logic element or a field programmable gate array (FPGA) with a microprocessor. The digital storage medium can therefore be machine-readable or computer readable. Thus, some exemplary embodiments comprise a data medium that has electronically readable control signals that are able to interact with a programmable computer system or programmable hardware component in such a way that one of the methods described herein is carried out. In general, exemplary embodiments or parts of the exemplary embodiments of the present invention can be implemented as a program, as firmware, as a computer program or as a computer program product with program code or as data, wherein the program code or the data is effective to the effect of carrying out one of the methods or a part of a method if the program runs on a processor or programmable hardware component.

The invention claimed is:

1. A method for recording a microscopic fluorescence image of a sample region containing a biological sample, said method comprising:
   directing a laser beam by at least one objective on a sample region comprising a biological sample resting on an upper surface of a biochip embedded in a liquid substance, the sample covered by a coverslip having an upper side and a lower side,
      wherein the sample region comprises at least one boundary surface comprising a first boundary surface formed by the upper side of the coverslip, a second boundary surface formed by the lower side of the coverslip, and a third boundary surface formed by the upper surface of the biochip, and wherein the objective effectuates focusing of the laser beam in a focusing plane, changing a relative distance between the objective and the sample region along an optical axis of the objective for the purposes of effecting respective, different relative distances, wherein the effecting of each of the respective relative distances comprises:

capturing a respective set of pixel intensity values that are effectuated on corresponding sensor pixels of an image sensor by the laser beam that is reflected at the at least one boundary surface and transmitted back through the objective, and determining a respective focus metric on the basis of the respective set of pixel intensity values captured for the respective relative distance, determining a preferred relative distance on the basis of the determined focus metric, setting the preferred relative distance, illuminating the sample region with excitation radiation, and capturing a microscopic fluorescence image by the image sensor, wherein the image sensor is a photosensor with a color filter matrix disposed upstream thereof, wherein the microscopic fluorescence image is a color image, and wherein the laser beam has a wavelength greater than 800 nm.

2. The method according to claim 1, wherein the microscopic fluorescence image is a digital color image.

3. The method according to claim 1, wherein the wavelength lies in a range of greater than 800 nm to 1000 nm.

4. The method according to claim 1, wherein the color filter matrix is a matrix with a plurality of color channels.

5. The method according to claim 4, wherein the color filter matrix is a Bayer matrix.

6. The method according to claim 1, wherein the photosensor is a CMOS sensor or a CCD sensor.

7. The method according to claim 1, wherein capturing the respective set of pixel intensity values for the respective relative distance is implemented by way of capturing respective subsets of pixel intensity values of respective color channels, and wherein the respective set of pixel intensity values is determined on the basis of the subsets.

8. The method according to claim 7, wherein the respective color channels have respective transmissivity values at the wavelength of the laser beam, said transmissivity values deviating from one another by no more than a factor of 5.

9. The method according to claim 1, wherein the laser beam substantially has a collimated, parallel bundle of rays.

10. The method according to claim 1, wherein a lens or lens system is disposed in a detection beam path between the objective and the image sensor, said lens or lens system imaging a focal plane of the objective on the image sensor.

11. The method according to claim 1, further comprising:
determining a respective highest pixel intensity value as the respective focus metric for the respective relative distance on the basis of the respective set of pixel intensity values, determining a profile of respective highest pixel intensity values by assigning the respective highest pixel intensity value to the respective relative distance, and determining the preferred relative distance on the basis of at least one maximum of the profile of the respective highest pixel intensity values.

12. The method according to claim 11, further comprising:

changing the relative distance by reducing the relative distance to a smallest distance using a first distance resolution after starting from a greatest distance such that the profile has a plurality of maxima, determining a temporarily preferred relative distance on the basis of the plurality of maxima, increasing the relative distance to the temporarily preferred relative distance using a second distance resolution, which is higher than the first distance resolution, while simultaneously capturing respective highest pixel intensity values as respective focus metrics at respective, further relative distances, and detecting a presence of a local maximum on the basis of the further highest pixel intensity values and determining a preferred, final relative distance as the relative distance at which the local maximum is present.

13. A microscopy system for recording a microscopic fluorescence image of a sample region containing a biological sample, said microscopy system comprising:

a sample holder for holding a sample region comprising a biological sample resting on an upper surface of a biochip embedded in a liquid substance, the sample covered by a coverslip having an upper side and a lower side, wherein the sample region comprises at least one boundary surface comprising a first boundary surface formed by the upper side of the coverslip, a second boundary surface formed by the lower side of the coverslip, and a third boundary surface formed by the upper surface of the biochip, a laser source for generating a laser beam, an excitation light source for emitting excitation light onto the sample region, at least one objective that is configured to direct the laser beam on the sample region and effectuate focusing of the laser beam in a focusing plane, an image sensor for capturing a set of pixel intensity values that are effectuated on corresponding sensor pixels of the image sensor by the laser beam that is reflected at the at least one boundary surface and transmitted back through the objective, wherein the objective and the sample holder are displaceable relative to one another along an optical axis of the objective such that a relative distance between objective and sample region is capable of being altered, and at least one processor configured to execute instructions that cause the microscopy system to:

actuate the objective and/or the sample holder in such a way that the objective and the sample holder or the sample region have respective, different relative distances from one another, capture a respective set of pixel intensity values for the respective relative distance by means of the image sensor and determine a respective focus metric on the basis of the respective set of pixel intensity values, determine a preferred relative distance on the basis of the determined focus metric, actuate the objective and/or the sample holder in such a way that the preferred relative distance is set, activate the excitation light source, and capture a microscopic fluorescence image by the image sensor, wherein the image sensor is a photosensor with a color filter matrix disposed upstream thereof, wherein the microscopic fluorescence image is a color image, and wherein the laser beam has a wavelength greater than 800 nm.

14. A processor comprising one or more interfaces, wherein, via the one or more interfaces, the processor is configured to:

send a first control signal for activating a laser light source, send a second control signal for actuating an objective and/or a sample holder such that the objective and the sample holder have respective, different relative distances from one another, wherein the sample holder holds a sample region comprising a biological sample resting on an upper surface of a biochip embedded in a liquid substance, the sample covered by a coverslip having an upper side and a lower side, and wherein the sample region comprises at least one boundary surface comprising a first boundary surface formed by the upper side of the coverslip, a second boundary surface formed by the lower side of the coverslip, and a third boundary surface formed by the upper surface of the biochip, receive, from an image sensor with a color filter matrix disposed upstream thereof, a respective set of pixel intensity values for a respective relative distance, determine a respective focus metric on the basis of the respective set of pixel intensity values, determine a preferred relative distance on the basis of the determined focus metric, send the second control signal or a further control signal for actuating the objective and/or the sample holder in such a way that the preferred relative distance is set, send a third control signal for activating an excitation light source, receive pixel intensity values from the image sensor, and determine a microscopic fluorescence image on the basis of the received pixel intensity values, wherein the microscopic fluorescence image is a color image and the laser light source has a wavelength greater than 800 nm.

15. The method according to claim 1, wherein the microscopic fluorescence image is a digital color image comprising at least a green component and a red component.

16. The method according to claim 15, wherein the digital color image further comprises a blue component.

17. The method according to claim 1, wherein the plurality of color channels comprises at least a green channel and a red channel.

18. The method according to claim 17, wherein the plurality of color channels further comprises a blue channel.

* * * * *